(12) United States Patent
Engle et al.

(10) Patent No.: US 6,516,943 B2
(45) Date of Patent: Feb. 11, 2003

(54) CONVEYOR BELT SPLICE COVER, AND METHODS

(75) Inventors: Lori P. Engle, Little Canada, MN (US); Brian E. Spiewak, Inver Grove Heights, MN (US); Joseph F. Sarageno, Jr., Northfield, MN (US); George J. Clements, Afton, MN (US); Christine A. Burbach, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 34 days.

(21) Appl. No.: 09/833,854

(22) Filed: Apr. 12, 2001

(65) Prior Publication Data

US 2002/0170806 A1 Nov. 21, 2002

(51) Int. Cl.[7] ............................................... B65G 15/30
(52) U.S. Cl. ........................................ 198/844.2; 24/38
(58) Field of Search ........................ 198/844.2; 24/38, 24/33 P, 31 B, 31 V (56) References Cited

U.S. PATENT DOCUMENTS

| | | | |
|---|---|---|---|
| 3,461,511 A | 8/1969 | Perina | |
| 4,050,322 A | 9/1977 | Möring | |
| 4,170,281 A | * 10/1979 | Lapeyre | 198/844.2 |
| 4,427,107 A | 1/1984 | Roberts et al. | |
| 4,660,259 A | 4/1987 | Ausnit | |
| 4,737,138 A | 4/1988 | Komai et al. | |
| 4,778,282 A | 10/1988 | Borchardt et al. | |
| 4,861,322 A | 8/1989 | Reddick | |
| 4,894,060 A | 1/1990 | Nestegard | |
| 5,246,100 A | * 9/1993 | Stone et al. | 198/844.2 |
| 5,360,379 A | 11/1994 | Carelli et al. | |
| 5,377,818 A | 1/1995 | White | |
| 5,549,193 A | * 8/1996 | Schlueter, Jr. et al. | 198/844.2 |
| 5,689,866 A | 11/1997 | Kasai et al. | |
| 5,729,876 A | 3/1998 | Johnson | |
| 5,789,052 A | 8/1998 | Miller et al. | |
| 5,791,383 A | 8/1998 | Eckhardt | |
| 6,170,128 B1 | * 1/2001 | Barner et al. | 198/844.2 |
| 6,234,305 B1 | * 5/2001 | Brown et al. | 198/844.2 |

FOREIGN PATENT DOCUMENTS

| | | |
|---|---|---|
| AU | 199923965 A1 | 4/1999 |
| CA | 2019918 | 6/1990 |
| EP | 0 274 244 A1 | 7/1988 |
| EP | 0 481 562 B1 | 4/1998 |
| WO | WO 91/02452 | 3/1991 |
| WO | WO 98/21501 | 5/1998 |
| WO | WO 99/17630 | 4/1999 |

OTHER PUBLICATIONS

U.S. patent application Ser. No. 09/501,900, filed Feb. 10, 2000 (Applicant Docket No. 55269USA1A.002).

* cited by examiner

Primary Examiner—James R. Bidwell
(74) Attorney, Agent, or Firm—James J. Trussell (57) ABSTRACT

A flexible cover for protecting a splice of a conveyor belt, in particular, for protecting the belt fastener that forms the splice. The splice cover includes a body having a first surface and an opposite second surface, with a plurality of first reclosable fasteners extending from the first surface. The first reclosable fasteners engage with a plurality of second reclosable fasteners, which are attached to the belt. The second reclosable fasteners can be secured to the belt by the belt fastener, by adhesive or other attachment means, by being integral with the belt fastener, or by being integral with the belt web. The second reclosable fastener can be any structure that engages, interlocks, mates, or otherwise attaches to first reclosable fastener. Also provided are methods for making the splice cover, and methods for placing and removing the splice cover over the belt fastener.

29 Claims, 5 Drawing Sheets

CONVEYOR BELT SPLICE COVER, AND METHODS

This invention relates to splicing of conveyor belts. In particular, this invention relates to covers for protecting the spliced area of conveyor belts.

BACKGROUND OF THE INVENTION

Endless belts are generally made by securing two ends of a length of web material together at a splice to form a continuous loop. The two most common splice types are a lap splice and a butt splice. In a lap splice, the two ends overlap one another, and in a butt splice, the two ends abut, without any overlap. In many applications, the splice is held together by adhesive, tape, or a combination of the two. Additionally or alternatively, in many heavy-duty applications, the splice is held together by a vulcanized bond. Typically for conveyor belts, a belt fastener such as a staple, clip, or other similar fastener is often used to join the two ends in a butt splice. Canadian patent application 2,019,918 uses interlocking members to connect and secure the two ends. Most belt fasteners, such as the staples or clips, are typically metal.

In heavy-duty applications, such as mining and excavating operations, the metal fasteners can easily be damaged and weakened by strong impact of items, such as rocks and boulders, and abrasion caused by fines trapped in and around the fasteners. Also, many mining or excavating operations include a scraping blade that runs along the surface of the conveyor belt to remove any accumulated material from the surface of the belt. This blade can also damage the metal fasteners. If the fasteners become too damaged, there is a likelihood that the fasteners can pull out, break, or otherwise cause failure due to the splice being the weakest point of the belt.

What would be desired is a cover to protect the fasteners from unduly harsh conditions and to extend the life of the splice. Various attempts to protect the splice area have been made. For example, a plastic or steel splice cover is disclosed in Australian Patent AU 199923965. This splice cover is positioned over the fasteners and held in place by screws. Other attempts have included placing a material over the belt fasteners that is held on by adhesive.

SUMMARY OF THE INVENTION

The present invention is directed to a removable and replaceable cover for positioning over a splice area of a web. The removable and replaceable cover protects the belt fasteners used to secure the splice from damaging impacts and abrasion that are generally encountered in many conveyor belt applications.

In one particular embodiment, a conveyor belt having a splice cover is provided. The conveyor belt comprises a belt web having a first end and an opposite second end, and the first end attached to the second end to provide a splice. A belt fastener can be used to attach the first end to the second end. A conveyor belt splice cover is positioned atop the belt fastener, the conveyor belt splice cover comprising a flexible body having a first surface and an opposite second surface, and a plurality of first reclosable fasteners positioned on and extending from the first surface. A plurality of second reclosable fasteners, configured to releaseably interlock with the first reclosable fasteners, are positioned on the conveyor belt web. The first reclosable fasteners are releaseably interlocked with the second reclosable fasteners.

Also provided is a method for placing a splice cover on a splice of a conveyor belt, the conveyor belt comprising a belt fastener securing a first end of a web to a second end of a web to form an endless loop, the method comprising positioning a splice cover in alignment with the belt fastener and attaching the splice cover to the conveyor belt over the belt fastener. The splice cover comprises a flexible body having a first side and a plurality of first reclosable fasteners extending from the first side. The splice cover is attached to the conveyor belt over the belt fastener by interlocking the first reclosable fastener with a second reclosable fastener, the second reclosable fastener positioned on the conveyor belt.

Various other embodiments are also provided.

BRIEF DESCRIPTION OF THE DRAWINGS

The present invention will be described in relation to the following drawings, where like numerals are used throughout to represent like features.

DETAILED DESCRIPTION OF THE PREFERRED EMBODIMENT

The preferred embodiment of the invention is now described in detail with reference to the drawings, wherein like reference numerals represent like parts and assemblies throughout the several views.

Figure 1:
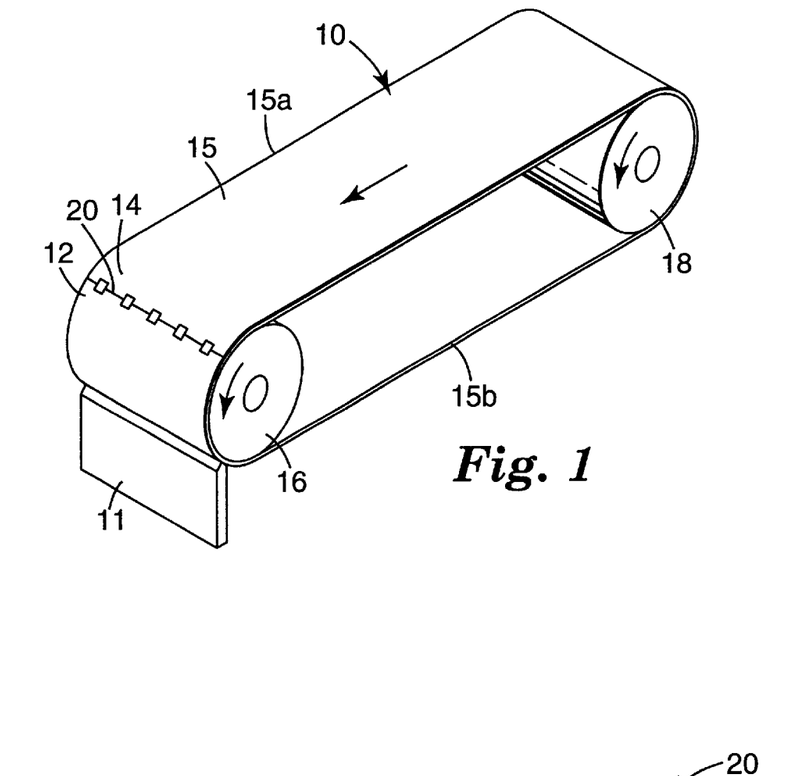
FIG. 1 is a perspective view of a conveyor belt.

In FIG. 1, there is shown a conventional conveyor belt apparatus. Conveyor belt 10 is an endless loop supported on rollers 16, 18, at least one of which is a drive wheel. As rollers 16, 18 rotate in the direction indicated, conveyor belt 10 carries any objects on conveyor belt 10 in the longitudinal direction of belt 10, as indicated by the arrow. A scraper blade 11 is positioned in close proximity to, often in touching relation to, conveyor belt 10; scraper blade 11 removes any material that may be present on conveyor belt 10.

Conveyor belt 10 is made of an elongate web 15 having a first end 12 and a second end 14 that are connected to one another at a splice 20. Splice 20 extends generally transverse across web 15, from a first side edge 15a to a second side edge 15b. In most embodiments, splice 20 extends across the shortest distance from first side edge 15a to second side edge 15b, but in some embodiments, splice 20 may run at an angle between edges 15a, 15b, for example at an angle of about 30 or 45 degrees, in respect to one of edges 15a, 15b. Such angled splices are preferred in some applications.

Figure 2A:
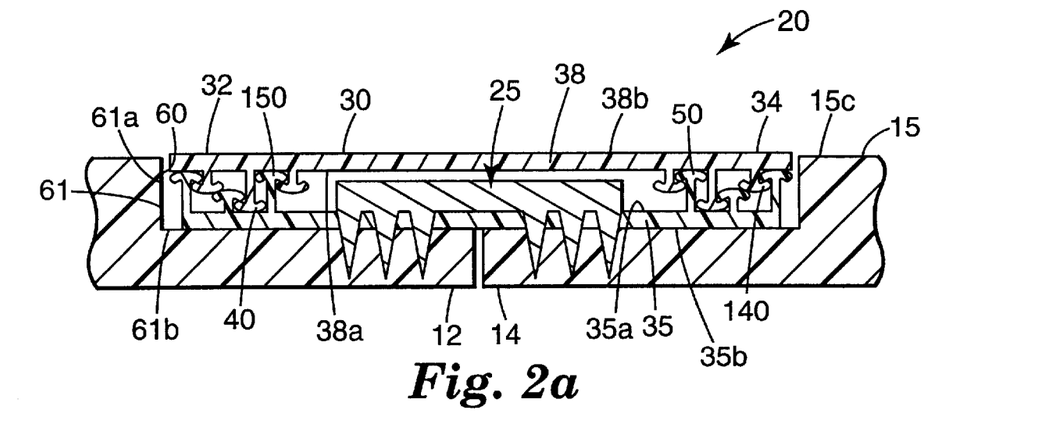
FIG. 2a is an enlarged cross-sectional view of a conveyor belt splice area having a belt fastener and a first embodiment of a splice cover.

Referring now to FIG. 2a, a belt fastener 25 secures first end 12 of web 15 to second end 14 of web 15. Generally, multiple belt fasteners 25 are spaced equally along the length of splice 20 from first side edge 15a to second side edge 15b. First end 12 may touch second end 14, or a gap may exists between ends 12, 14, as shown in FIG. 2a; the type of belt fastener 25 used may require a gap or contact between ends 12, 14. Examples of belt fasteners 25 that can be used to secure first end 12 to second end 14 include, for example, nails, screws, bolts, rivets, snaps, clasps, clips, latches, buttons, and zippers. Most belt fasteners commonly embed, at least partially, into web 15; conversely, other belt fasteners, such as bolts and zippers, commonly extend through web 15. Examples of belt fasteners 25 include those commercially available from Flexible Steel Lacing Company, also known as Flexco, of Downers Grove, Ill., and MATO GmbH & Co. of Mühlheim, Germany. In some embodiments, an adhesive tape, nylon tape, or other item may be present to cover any gap between first end 12 and second end 14.

It is understood that it is not necessary that ends 12, 14 being joined at splice 20 are from the same web 15. Rather, a first end of a first web and a first end of a second web can be joined at a splice to form a third web, which is composed of the first web and the second web. It is this third web that is then spliced to provide the endless loop.

Splice Cover

Still referring to FIG. 2a, positioned over belt fastener 25 is a splice cover 30 according to the present invention. Splice cover 30 has a body 38 that extends from a first end 32 to a second end 34, and has a first inner surface 38a and a second outer surface 38b. First end 32 and second end 34 are positioned in relation to one another in the longitudinal direction of belt 10, and each end 32, 34 extends transversely across belt 10. When installed over belt fastener 25, inner surface 38a is positioned in close proximity to belt fastener 25, often, in touching relationship with belt fastener 25. Body 38 is sufficiently flexible to be able to track with conveyor belt 10 around rollers 16, 18 and any other rollers or bars without becoming detached from its position over belt fastener 25. Body 38 is also sufficiently deformable or elastic to stretch as necessary to track around rollers 16, 18; preferably, after stretching, body 38 returns substantially to an unstretched state.

Body 38 of splice cover 30 is flexible, resilient and generally planar. In some embodiments, body 38 may be less flexible in its transverse or lateral direction, from first side edge 15a of web 15 to second side edge 15b, than in its longitudinal direction, from first end 32 to second end 34. Body 38 is sufficiently flexible to bend and flex with web 15 as belt 10 travels on rollers 16, 18. Preferably, body 38 has a thickness of at least about 0.02 mm. Additionally or alternatively, body 38 has a thickness no greater than about 6 mm. Typically, body 38 has a thickness of about 0.1 mm to 2 mm, and preferably, body 38 has a thickness of about 0.5 mm to 1.5 mm.

Typical materials for body 38 are elastomeric or polymeric materials, generally thermoplastic materials, although thermosetting materials could be used in some embodiments. Suitable thermoplastic polymers include, for example: polyolefins such as polypropylene or polyethylene, polyester, polystyrene, polycarbonate, polymethyl methacrylate, ethylene vinyl acetate copolymers, acrylate-modified ethylene vinyl acetate polymers, ethylene acrylic acid copolymers, acrylonitrile-butadiene-styrene terpolymers, nylon, polyvinylchloride, and engineering polymers such as polyketones or polymethylpentanes. Elastomers include, for example: natural or synthetic rubber; styrenic copolymers containing isoprene, butadiene, ethylene, butylene, or acrylonitrile; metallocene-catalyzed polyolefins; polyurethanes; and polydiorganosiloxanes. Mixtures of the polymers and/or elastomers may also be used. Multilayer coextrusion may be used to segregate materials into only one or more layers of a splice cover of the invention.

Body 38 may include a reinforcing structure such as a scrim, reinforcing fiber (either oriented or randomly dispersed within body 38), a woven or nonwoven fabric insert, and the like, to increase tear or puncture resistance of splice cover 30 and to provide stability. Any reinforcing structure may be present on a surface of body 38 or within body 38.

Suitable additives for materials used for body 38 include, for example, plasticizers, tackifiers, fillers, colorants, ultraviolet light stabilizers, flame retardants, antioxidants, processing aids (urethanes, silicones, fluoropolymers, etc.), low-coefficient-of-friction materials (silicone, graphite), electrically or thermally conductive fillers, magnetic fillers, pigments, and combinations thereof The splice cover of the invention may be opaque and have a color, or it may be essentially clear to allow viewing of material under the body 38. Generally, additives can be present in amounts up to 50 percent by weight of the composition depending on the application. Multilayer coextrusion may be used to segregate an additive such as a flame retardant into only one or more layers of a splice cover of the invention.

Splice cover 30 extends over and covers belt fastener 25. Preferably, splice cover 30 is positioned over and covers any and all belt fasteners 25 present at splice 20, and more preferably, splice cover 30 extends from first side edge 15a to second side edge 15b of web 15. Splice cover 30 protects fastener 25 from the damage caused by items such as rocks falling onto splice 20 and from the harsh forces caused by scraping blade 11.

First Reclosable Fasteners on Cover

Still in reference to FIG. 2a, extending from splice cover 30, specifically from inner surface 38a, is a plurality of first reclosable fasteners 40. The plurality of first reclosable fasteners 40 may be present across the entire inner surface 38a, or, as shown in FIG. 2a, may not be present across the entire inner surface 38a. Rather, an area of inner surface 38a is free of first reclosable fasteners 40.

Figure 2B:
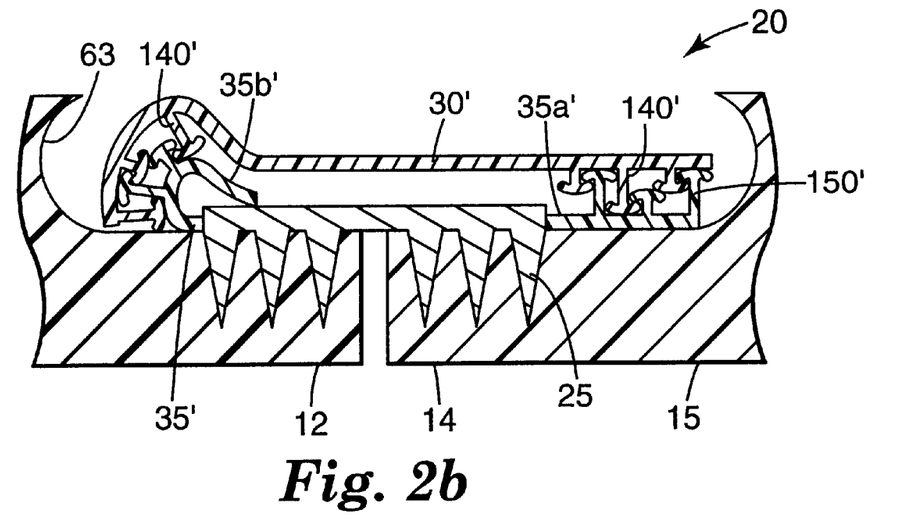
FIG. 2b is an enlarged cross-sectional view of a conveyor belt splice area having a belt fastener and a second embodiment of a splice cover.
Figure 2C:
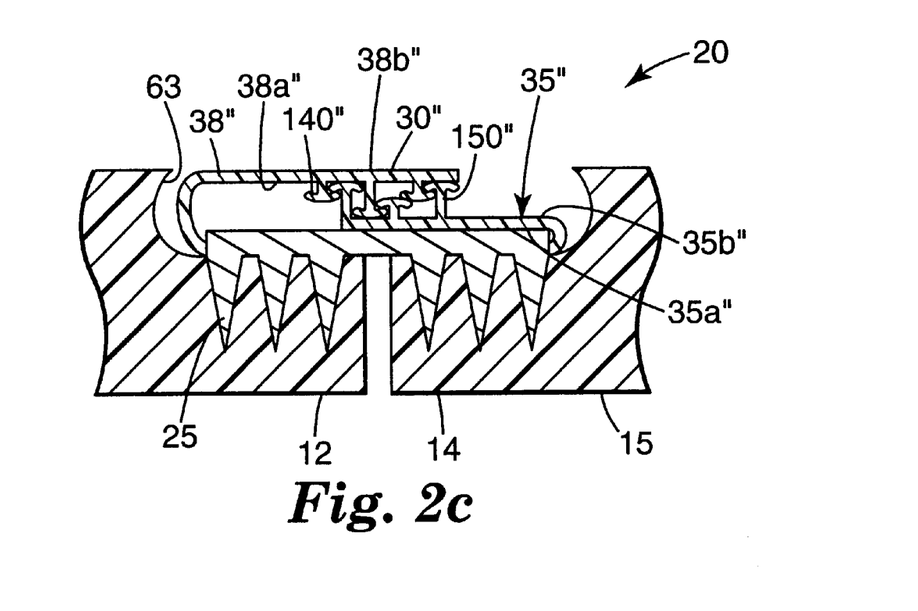
FIG. 2c is an enlarged cross-sectional view of a conveyor belt splice area having a belt fastener and a third embodiment of a splice cover.

In FIG. 2a, a first portion of first reclosable fasteners 40 is located at first end 32 of splice cover 30 and a second portion of first reclosable fasteners 40 is located at second end 34 of splice cover 30. When splice cover 30 is integrated into a conveyor belt such as belt 10 of FIG. 1, first end 32 is the "leading edge" of splice cover 30 and second end 34 is the "trailing edge", meaning that first end 32 meets scraper blade 11 before second end 34. Thus, for splice cover 30, there is a first or front portion of first reclosable fasteners 40 at the leading edge and a second or back portion of first reclosable fasteners 40 at the trailing edge. Similarly in FIG. 2b, first reclosable fasteners 140' have a front portion at the leading edge and a back portion at the trailing edge of splice cover 30'; an area void of first reclosable fasteners 140' is positioned between the front portion and the back portion. In FIG. 2c, first reclosable fasteners 140" could extend essentially the entire inner surface 38a" of splice cover 30".

It is not necessary that the front portion of first reclosable fasteners 40 include the same type of reclosable fasteners as the back portion of the first reclosable fasteners 40. That is, the two portions may use reclosable fasteners having different structures. In some embodiments, it may be desired to have a stronger engagement of the reclosable fasteners at the leading edge than at the trailing edge.

First reclosable fasteners 40, whether across entire inner surface 38a or only sections thereof, hold splice cover 30 in position over belt fastener 25, and will be described in detailed below.

First reclosable fasteners 40 are permanently attached to body 38, and are preferably integral with body 38. By the term "integral", it is meant that body 38 and first reclosable fasteners 40 are substantially coextensive with no break or distinct physical separation between the two. It is understood that with use, first reclosable fasteners 40 may weaken and tear or otherwise become at least partially separated from body 38; however, prior to such a destructive event, reclosable fasteners 40 are integral with body 38. Additional information about first reclosable fasteners 40 being integral with body 38 is provided below.

Second Reclosable Fasteners on Belt

To retain splice cover 30 in relation to belt fastener 25 and splice 20, first reclosable fasteners 40 engage with a plurality of second reclosable fasteners 50, which are fixedly secured in relation to belt fastener 25. First reclosable fasteners 40 and second reclosable fasteners 50 engage, interlock, or mate on demand, and disengage, unlock, or unmate on demand. It is this on-demand engagement of first reclosable fasteners 40 with second reclosable fasteners 50 that hold and retain splice cover 30 in position over belt fastener 25.

Second reclosable fastener 50 is selected based on first reclosable fastener 40 and the desired interlocking, intermeshing, or mating properties thereof Second reclosable fastener 50 can be any structure that engages, interlocks, intermeshes, mates, or otherwise attaches to first reclosable fastener 40.

One common second reclosable fastener 50 for first reclosable fastener 40 is loops or other similar fibrous material. Such a mechanical engagement system is often referred to as "hook & loop", and various styles are commercially available, such as from Velcro USA Inc. of Manchester, N.H.; YKK Inc. of Lyndhurst, N.J.; Aplix U.S. of Charlotte, N.C. and Aplix International of Paris, France; Kuraray Co., Ltd. of Osaka and Tokyo, Japan; and Proctor & Gamble Company of Cincinnati, Ohio.

The "loop" material used as second reclosable fastener 50 for first reclosable fastener 40 may be a material having fibrous loops extending therefrom, or may be a nonwoven material that is an open porous lofty polymer filament structure. Typical fibrous filaments for loop materials and nonwoven materials include polyamides, polyesters, and polypropylene.

Another common second reclosable fastener 50 for engagement with first reclosable fastener 40 is a structure the same as first reclosable fastener 40; such a reclosable fastener is often referred to as a "self-mating fastener" or a "self-mating reclosable fastener". A self-mating fastener can engage with itself or with an identical structure.

Yet another common second reclosable fastener 50 for engagement with first reclosable fastener 40 includes a reclosable fastener that is not a loop or other fibrous material as discussed above, and that is different in structure than first reclosable fastener 40. That is, reclosable fastener 50 is not a loop or a self-mating reclosable fastener, but is capable of engaging with first reclosable fastener 40.

Whether self-mating or non-self-mating fasteners, generally, each of reclosable fastener 40, and preferably second reclosable fastener 50, includes a stem or stalk with an engaging head. Although shown in cross-section in the various Figures, reclosable fasteners 40, 50 are preferably elongate rib structures. Typically, there is a multiplicity of parallel, narrowly spaced ribs, each rib having a stem or stalk with an engaging head.

The engaging head of first reclosable fastener 40 meshes, grips, mates, interlocks, or otherwise engages with the engaging head of second reclosable fastener 50. If second reclosable fastener 50 is a loop or other such structure, the engaging head of first reclosable fastener 40 engages with the loops or other structure.

One type of non-self-mating closure system that can be used for first and second reclosable fasteners may be referred to as "male" and "female" connectors, or simply as "first" and "second", or interlocking, connectors. Examples of such closure systems are taught, for example, in U.S. Pat. Nos. 4,660,259; 4,778,282; 5,689,866; and 5,729,876. These closures often use first and second reclosable fasteners 40, 50 that are different from one another.

Various examples of reclosable fastener structures that can be used for either or both first reclosable fastener 40 and second reclosable fastener 50 are shown in cross-section in FIGS. 2a through 12. These reclosable fasteners 140, 150, 240, 250, 340, 440, 540, 640, 740, 840, 940, 1040 can be self-mating fasteners, can be mated with a reclosable fastener construction different than itself, or can be mated with a loop or other such structure.

One common feature generally found in each of reclosable fasteners 140, 150, 240, 250, 340, 440, 540, 640, 740, 840, 940, 1040 is that each reclosable fastener has at least one stem from which extends an engagement head. This engagement surface may include a second stem, such as reclosable fasteners 640, 740, 840 in FIGS. 8 through 10. The stem portion of the reclosable fasteners flexes during interconnection with a second reclosable fastener in preference to flexing of the engaging head. This generally applies for both self-mating fasteners and non-self-mating fasteners.

Figure 4:
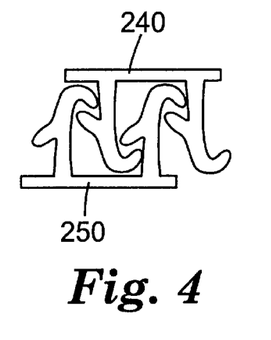
FIG. 4 is a second embodiment of a reclosable fastener usable with the splice cover of the present invention.
Figure 5:
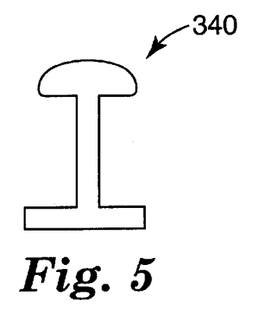
FIG. 5 is a third embodiment of a reclosable fastener usable with the splice cover of the present invention.
Figure 6:
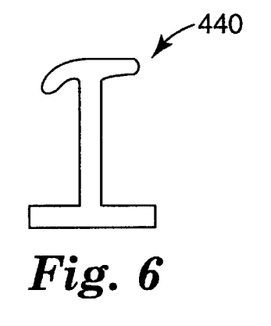
FIG. 6 is a fourth embodiment of a reclosable fastener usable with the splice cover of the present invention.
Figure 7:
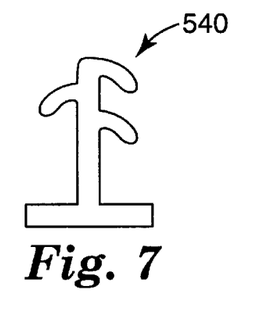
FIG. 7 is a fifth embodiment of a reclosable fastener usable with the splice cover of the present invention.
Figure 8:
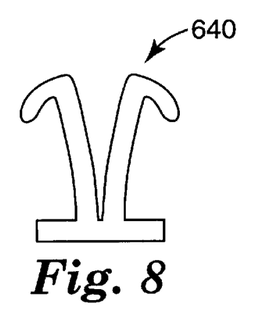
FIG. 8 is a sixth embodiment of a reclosable fastener usable with the splice cover of the present invention.
Figure 9:
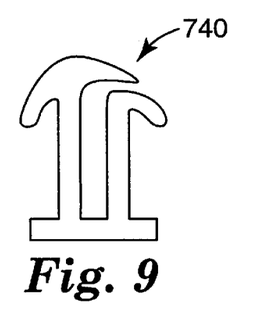
FIG. 9 is a seventh embodiment of a reclosable fastener usable with the splice cover of the present invention.
Figure 10:
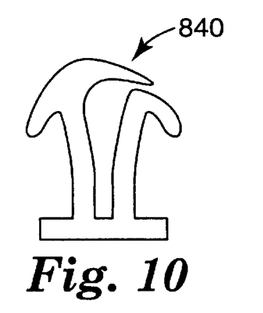
FIG. 10 is an eighth embodiment of a reclosable fastener usable with the splice cover of the present invention.
Figure 11:
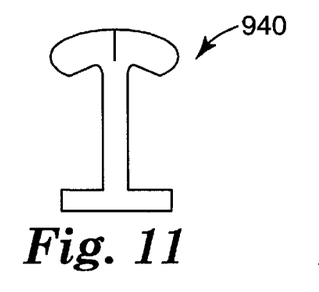
FIG. 11 is a ninth embodiment of a reclosable fastener usable with the splice cover of the present invention.

The engagement head of each reclosable fastener may have a single flange extending from the stem, such as for reclosable fastener 640 of FIG. 8, or may have multiple flanges extending in opposite directions from the stem, such as, for example, for reclosable fasteners 340, 440, 540 of FIGS. 5 through 7. Specifically, reclosable fastener 340 of FIG. 5 has two identical flanges extending oppositely from the stem. Reclosable fastener 440 of FIG. 6 has two different shaped flanges extending oppositely from the stem. And in FIG. 7, reclosable fastener 540 has three identical flanges, two of which extend opposite from the third flange. Various engagement surface configurations are shown in FIGS. 3 through 12.

Figure 3:
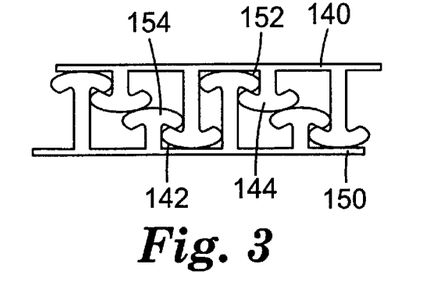
FIG. 3 is a first embodiment of a reclosable fastener usable with the splice cover of the present invention.

Referring again to FIG. 2a, and also to FIG. 3, a specific embodiment of reclosable fasteners 40, 50, specifically, first reclosable fastener 140 and second reclosable fastener 150, is shown. In FIGS. 2b and 2c, reclosable fasteners are designated as first reclosable fasteners 140', 140" and second reclosable fasteners 150', 150", respectively.

Second reclosable fasteners 150, 150', 150" are present on a base attachment segment 35, 35', 35", respectively, which are attached to belt 10 by belt fastener 25. Base attachment segment 35, 35', 35" has an inner surface 35a, 35a', 35a" and an outer surface 35b, 35b', 35b". When installed under belt fastener 25, inner surface 35a, 35a', 35a" is positioned in close proximity to belt fastener 25, often, in touching relationship with belt fastener 25. In another aspect, inner surface 35a, 35a', 35a" is generally positioned closer to splice cover 30, 30', 30" than outer surface 35b, 35b', 35b".

In FIGS. 2a and 2b, second reclosable fasteners 150, 150' are present as a plurality of ribs located as a front portion at the leading edge and as a back portion at the trailing edge, with an area void of ribs positioned between the front portion and the back portion. In FIG. 2a, the entire plurality of second reclosable fastener 150 is present on the same side of segment 35, specifically on inner surface 35a. In FIG. 2b, a first portion of second reclosable fastener 150' is present on inner surface 35a' and a portion is present on outer surface 35b'. Specifically, the front portion of second reclosable fastener 150', at the leading edge, is present on outer surface 35b' and the back portion of second reclosable fastener 150' is on inner surface 35a'.

In FIG. 2c, second reclosable fastener 150" can extend across and cover essentially the entire surface 35b" of base attachment segment 35". In FIG. 2c, each of the plurality of second reclosable fasteners 150" is present on outer surface 35b" of base attachment segment 35". First reclosable fasteners 140" are present on inner surface 38a" of splice cover 30". In this embodiment of FIG. 2c, splice cover 30" and base attachment segment 35" can be formed by a single construction. If a single construction, first reclosable fasteners 140" are present at one end of the construction and second reclosable fasteners 150" are present at the second, opposite end. There is no separate splice cover that is removable and detachable from belt fastener 25. Rather, splice cover 30" is attached to belt fastener 25. In the embodiment shown, base attachment segment 35" and splice cover 30" are a single structure that extends across both of belt ends 12, 14. Inner surface 38a" of splice cover 30" is the same, continuous surface as inner surface 35a" of base attachment segment 35"; similarly, outer surface 38b" of splice cover 30" is the same surface as outer surface 35b" of base attachment segment 35". Instead of one construction, two separate segments or constructions may be used, one positioned on each of first end 12 and second end 14 of web 15. If two separate segments are used, the two segments can also be secured to web 15 by belt fastener 25 or by another attachment mechanism.

Referring to any of FIGS. 2a, 2b, 2c, first reclosable fastener 140, and its similar structures 140', 140", have the same engagement surface structure as second reclosable fastener 150; thus, each of first reclosable fastener 140 and second reclosable fastener 150 is considered a self-mating reclosable fastener. It is understood that although first reclosable fastener 140 and second reclosable fastener 150 are considered to be the same, it is the stem and head portion, i.e., the engagement surface, of reclosable fasteners 140, 150 that are the same; the number of ribs of stems and heads may differ for first reclosable fastener 140 and second reclosable fastener 150 and still be considered to be the same.

The specific characteristics of the specific reclosable fasteners 140, 150 will be described in relation to FIG. 3, which schematically illustrates a cross-sectional view of first reclosable fastener 140 engaged with second reclosable fastener 150. As mentioned above, the reclosable fasteners such as reclosable fasteners 140, 150 are elongate ribs. First reclosable fastener 140 includes ribs of different height, with tall ribs 142 alternating with shorter ribs 144. Similarly, second reclosable fastener 150 includes tall ribs 152 and short ribs 154.

During engagement of reclosable fasteners 140, 150, tall ribs 142, 152 contact one another first; the heads of tall ribs 142, 152 tend to move into the gap caused by the shortness of the adjacent shorter ribs 144, 154. This self-aligning of the mating fasteners helps assure an easy and effective engagement. Upon further pressure on the fasteners, taller ribs 142 are directed by their contact with the adjacent shorter ribs 154 into a position where the head or flange of tall rib 142 slides under a flange of tall rib 152 of second reclosable fastener 150. Upon further pressure on the fasteners, the opposite flange of tall rib 142 moves under the other flange of short rib 154 of second reclosable fastener 150.

The lowest-force of engagement is obtained when tall ribs 142, 152 and short ribs 144, 154 alternate with one another one-by-one. The described movement of the head portion of tall ribs 142, 152 during engagement occurs unimpeded because there is no structure of equal height adjacent the tall ribs. Still desirable, but somewhat higher engagement forces can be obtained if a lesser ratio of short ribs is used so that some tall ribs are adjacent to one another. This repeated deviation from the profile of a full population of identical (e.g., equally tall) symmetrical ribs facilitates a lower-force engagement of the fasteners.

Additional specific details regarding first reclosable fastener 140 and second reclosable fastener 150 can be found in U.S. Patent Application having Ser. No. 09/501,900, filed Feb. 19, 2000, the disclosure of which is incorporated by reference in its entirety.

FIG. 4 shows a second embodiment of a self-mating fastener, specifically reclosable fasteners 240, 250. Reclosable fasteners 240, 250 are considered self-mating because the stem and head of first reclosable fastener 240 is the same as that of second reclosable fastener 250. Additional specific details regarding first reclosable fastener 240 and second reclosable fastener 250 can be found in U.S. Patent Application having Ser. No. 09/501,900, filed Feb. 19, 2000.

Self-mating fasteners, such as those discussed above, are generally preferred over other types of mating or engagement systems for various reasons. For example, the engagement of self-mating fasteners is often of the type that allows slide out disengagement of the two reclosable fasteners; for example, splice cover 30 can be slid laterally across web 15 to disengage first reclosable fastener 40 from second reclosable fastener 50. Additionally, self-mating fasteners provide easy engagement, as discussed above, yet the self-mating fasteners have relatively high peel strength.

Referring again to FIG. 2a, first reclosable fastener 40 generally has a height, defined by the distance from body 38 to the point of reclosable fastener 40 farthest from body 38, of at least about 0.02 mm. Additionally or alternatively, reclosable fasteners 40, 50 have a height no greater than about 7 mm. Typically, reclosable fasteners 40, 50 have a height of about 0.25 mm to 6.4 mm, preferably, about 0.5 to 3.3 mm, and most preferably, a height of about 1 mm to 2.8 mm.

Examples of commercially available reclosable fasteners 40, 50, including self-mating fasteners, are available from Minnesota Mining and Manufacturing Company, commonly referred to as 3M, under the trade designations "Dual-Lock™ Reclosable Fasteners", "Dual-Lock™ Low Profile Reclosable Fasteners", "Mating Surface Fasteners", "Reclosable Zipper Fasteners" and "Scotchmate™ Reclosable Fasteners". Various other reclosable fasteners 40, 50 are available from Velcro USA Inc. of Manchester, N.H.; YKK Inc. of Lyndhurst, N.J.; Gottlieb-Binder of Holzgerlingen, Germany; and Nifco Inc. of Tokyo, Japan.

The rib structure embodiment of reclosable fasteners 40, 50 preferably extends laterally or transversely with respect to web 15 from side edge 15a to side edge 15b. Alternately, the rib structure can be oriented in the longitudinal or belt direction, or at some intermediate angle between the belt direction and transverse direction.

Reclosable fasteners 40, 50 preferably extend the entire width of belt 10 or splice cover 30. In some embodiments the reclosable fasteners 40, 50 may extend short of the side edges 15a, 15b, that is, the reclosable fasteners 40, 50 do not extend all the way to edges 15a, 15b. Typically the rib structure is a continuous and co-extensive rib extending in the lateral or transverse direction of splice cover 30, although the rib structure could be interrupted or discontinuous. Various embodiments of reclosable fasteners 40, 50 having discontinuous or interrupted rib structures are known and can be used in conjunction with the present invention; see for example, U.S. Pat. No. 4,894,060 (Nestegard), incorporated by reference herein, which discloses cutting or slicing the ribs, which provides a more flexible rib. Typically, cover 30 or base attachment segment 35 is a single structure, although in some embodiments, cover 30 or base attachment segment 35 may be provided as multiple pieces.

Attachment of Second Reclosable Fastener to Web

Referring again to FIG. 2a and as stated above, first reclosable fastener 40 engages with second reclosable fastener 50, which is attached to web 15 or belt fastener 25 to retain splice cover 30 over belt fastener 25. Second reclosable fasteners 50 can be secured to web 15 by belt fastener 25 or by some other attachment mechanism; second reclosable fasteners 50 can be formed as part of belt fastener 25, such as an integral part of belt fastener 25; second reclosable fasteners 50 can be defined and formed by web 15; or second reclosable fasteners 50 can be attached directly to web 15.

A first and preferred mode for securing second reclosable fasteners 50 to web 15 in fixed relation to belt fastener 25 is shown in FIG. 2a, where a base attachment segment 35, having a plurality of second reclosable fasteners 50 extending therefrom is secured by belt fastener 25 to web 15. Belt fastener 25 is punched through base attachment segment 35 and attaches segment 35 to web 15. Base attachment segment 35 should be sufficiently tear resistant and otherwise have sufficient integrity to withstand the passing of belt fastener 25 through segment 35 without deleterious damage to segment 35. Any suitable additional attachment mechanism, such as adhesive, screws, or rivets, could be used to additionally secure base attachment segment 35 to web 15. To decrease the likelihood of base attachment segment 35 being snagged or caught by scraper blade 11, the ends of segment 35, particularly the leading edge of segment 35, should be securely attached to web 15.

A second mode for securing second reclosable fasteners 50 to web 15 in fixed relation to belt fastener 25 is to attach base attachment segment 35 by any suitable attachment mechanism to web 15 or to belt fastener 25. Suitable attachment mechanisms include adhesive, screws, staples, rivets, or any other attachment mechanism that does not substantially deform second reclosable fasteners 50. By use of the term "does not substantially deform" in this usage, it is intended that second reclosable fasteners 50 provide secure attachment to first reclosable fastener 40. Positioning at least part of segment 35 under belt fastener 25 decreases the likelihood of segment becoming loose from or shifting in relation to web 15.

Base attachment segment 35, having second reclosable fasteners 50 and attached to web 15 in fixed relation to belt fastener 25, can be made from a polymeric material, fibrous, metal, ceramic, or other suitable material, although a polymeric material is preferred. In many instances, base attachment segment 35 can be the same structure as splice cover 30; this provides a single structure than can be used as splice cover 30 and as base attachment segment 35. Such a configuration, with the same structure as splice cover 30 and base attachment segment 35, is a preferred embodiment. Alternately, two separate segments may be used, one positioned on each of first end 12 and second end 14 of web 15. If two separate segments are used, the two segments can also be secured to web 15 by belt fastener 25 or by another attachment mechanism.

Figure 13:
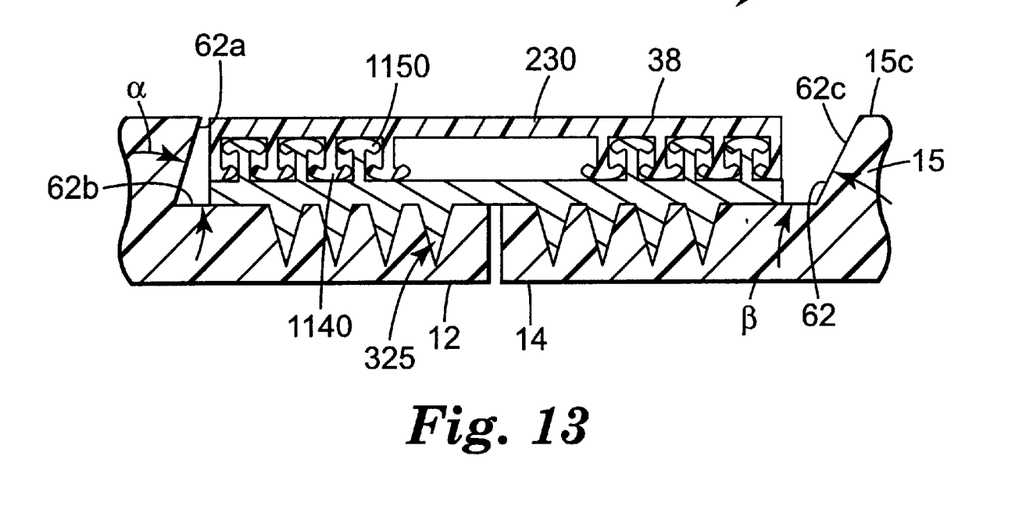
FIG. 13 is an enlarged cross-sectional view of a conveyor belt splice area having a belt fastener and a fourth embodiment of a splice cover.

Yet another mode for securing second reclosable fasteners 50 to belt fastener 25 is shown in FIG. 13, where second reclosable fasteners, specifically second reclosable fasteners 1150, is provided as a part of belt fastener 25. In particular in FIG. 13, first end 12 is joined to second end 14 by belt fastener 325. Second reclosable fasteners 1150 extend from belt fastener 325 opposite from the portion of belt fastener 325 that engages with web 15. In the specific embodiment shown in FIG. 13, second reclosable fasteners 1150 are integral with belt fastener 325; that is, second reclosable fastener 1150 and belt fastener 325 are one piece. For example, if belt fastener 325 is a cast metal piece, second reclosable fasteners 1150 would be provided onto belt fastener 325 by the casting process. Alternately, second reclosable fasteners 1150 may be secured to belt fastener 325 by adhesive, solder, welding, screws, rivets, or the like. Second reclosable fasteners 1150 engage with first reclosable fasteners 1140 of splice cover 230 to hold splice cover 230 over belt fastener 325.

Figure 14:
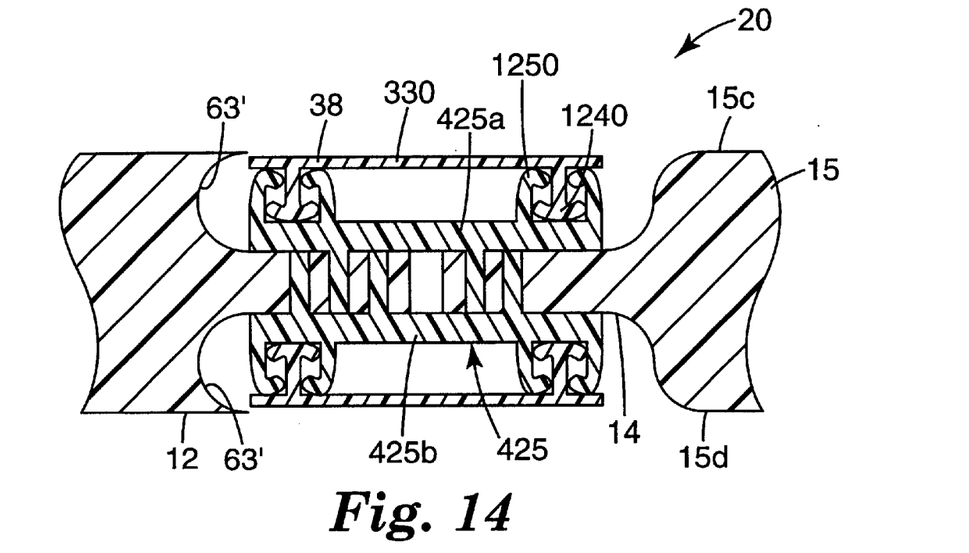
FIG. 14 is an enlarged cross-sectional view of a conveyor belt splice area having a belt fastener and a fifth embodiment of a splice cover.

A further mode for attaching first end 12 to second end 14 is illustrated in FIG. 14 as belt fastener 425. Belt fastener 425 consists of two pieces 425a, 425b, one positioned on each of opposite surfaces 15c and 15d of web 15 and each piece extending through web 15 to engage with the opposite piece. First piece 425a of belt fastener 425 is positioned at surface 15c of web 15 and second piece 425b of belt fastener 425 is positioned at surface 15d of web 15. Pieces 425a, 425b each extend through web 15 and engage and lock with the opposite piece to form a fastener through web 15 that creates splice 20. An example of a commercially available belt fastener that is similar to belt fastener 425 of FIG. 14 is the "Flexco Rivet Solid Plate" from Flexible Steel Lacing Company of Downers Grove, Ill.

Belt fastener 425 differs from that commercially available belt fastener in that belt fastener 425 is constructed and arranged to accept splice cover 330. Splice cover 330 includes a plurality of first reclosable fasteners 1240, and belt fastener 425 includes second reclosable fasteners, specifically, second reclosable fasteners 1250. Particularly, each of first and second piece 425a, 425b have second reclosable fastener 1250, so that each piece 425a, 425b engages with a splice cover 330.

Figure 15:
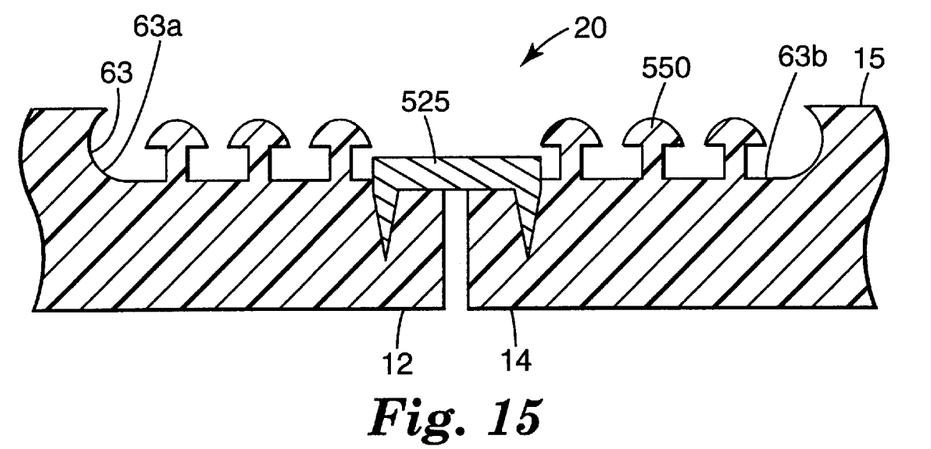
FIG. 15 is an enlarged cross-sectional view of a conveyor belt splice area having a belt fastener.

Another mode for attaching the second reclosable fastener to web 15 is shown in FIG. 15. Splice 20 is formed where first end 12 is joined to second end 14, in this embodiment, by belt fastener 525. The second reclosable fasteners are attached to web 15; specifically, second reclosable fasteners 550 are integral with web 15. Second reclosable fasteners 550 are formed by removing portions of web 15, for example by skiving, cutting or grinding, to define second reclosable fasteners 550. Second reclosable fasteners 550 are preferably elongate ribs that extend transverse across web 15, from a first side edge 15a to a second side edge 15b (FIG. 1).

Figure 16:
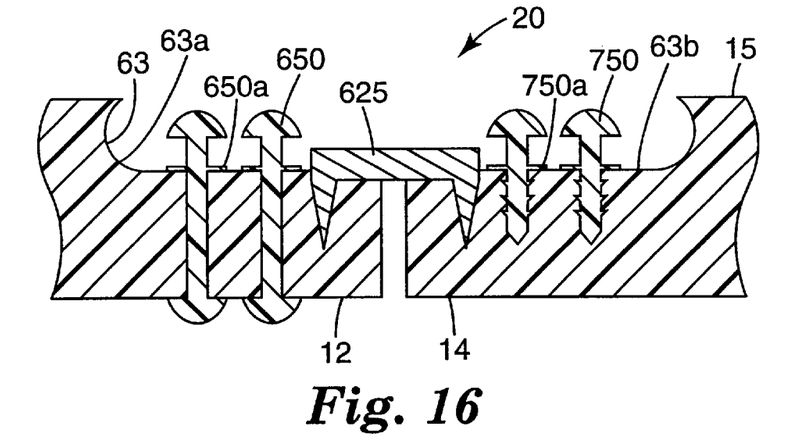
FIG. 16 is an enlarged cross-sectional view of a conveyor belt splice area having a belt fastener.

Yet another mode for attaching the second reclosable fastener to web 15 is shown in FIG. 16, where splice 20 is formed where first end 12 is joined to second end 14, in this embodiment, by belt fastener 625. Two variations of second reclosable fastener are shown, as second reclosable fastener 650 and second reclosable fastener 750. Each of second reclosable fastener 650, 750 is attached directly to web 15 with no external attachment mechanism other than that provided by second reclosable fasteners 650, 750 themselves. Second reclosable fastener 650 extends into and through web 15 and provides an attachment structure to engage with first reclosable fasteners 40 (not shown in FIG. 16). Second reclosable fastener 650 is similar to a stud, rivet, or the like that can be inserted completely through and secured to web 15. Second reclosable fastener 750 extends into, but not completely through, web 15 to provide an attachment structure. Second reclosable fastener 750 is similar to a nail, tack or the like.

It may be desired to include a ridge 650a, 750a or other structure on second reclosable fastener 650, 750 to keep a sufficient portion of second reclosable fastener 650, 750 exposed to allow attachment of first reclosable fastener thereto.

Typically, second reclosable fasteners 650, 750 will be individual structures and not a rib that extends transverse across web 15. Second reclosable fasteners 650, 750 can be modified to allow the head to extend continuously across web 15 as a rib, while the portion that extends or embeds into web 15 is discontinuous.

Various other configurations of fastener 25 and second reclosable fasteners 50 can be used for securing and retaining splice cover 30 over belt fastener 25.

Method of Making a Splice Cover

Splice cover 30, including first reclosable fastener 40, is preferably formed by extruding molten polymeric material through a die by conventional extrusion techniques to form body 38 integral with first reclosable fastener 40. The shape of the die is designed to generate a splice cover 30 with a desired cross-sectional shape for each of body 38 and first reclosable fastener 40. In one embodiment, the opening through which the polymeric material is extruded can be cut, for example, by electron discharge machining.

The material for body 38 and first reclosable fastener 40 is preferably an organic polymeric material, such as a thermosetting material or a thermoplastic material. Suitable thermoplastic materials include polyurethanes, polyamides, polyolefins (for example, polyethylene and polypropylene), polyesters, polyacrylics, polystyrenes, and combinations thereof Particularly preferred materials include polyurethane and acrylonitrile-butadiene-styrene (ABS) terpolymer; a combination of the two may also be preferred. The material may also comprise one or more additives, including but not limited to fillers, fibers, antistatic agents, lubricants, wetting agents, surfactants, pigments, dyes, coupling agents, plasticizers, and suspending agents.

Either body 38 or first reclosable fastener 40 may include multiple layers, generally of different material composition. Such multiple layers can be provided by coextrusion techniques (as described, for example, in PCT WO 99/17630, published Apr. 15, 1999), which may involve passing different melt streams from different extruders into a multiple-manifold die or a multiple-layer feed block and a film die. The individual streams merge in the feed block and enter the die as a layered stack that flows out into layers as the material leaves the die. Splice cover 30 may have body 38 of one composition and reclosable fasteners 40 of a different composition. Or a portion of reclosable fastener 40, e.g., the engaging head, may have a different composition from other portions of the reclosable fastener, e.g., the stem. For example, the engaging head may include a composition that forms a lower-friction surface than the stem.

One preferred reclosable fastener 40 comprises a blend of acrylonitrile-butadiene-styrene (ABS) terpolymer and polyurethane, preferably at a weight ratio of 1:3 ABS:polyurethane. One example of a preferred body 38 comprises polyurethane.

After being extruded, the cover material is generally quenched by pulling it through a quenching medium such as water, or by spraying it with a cooling medium, such as water or air. Alternately or additionally, the material can be cooled by passing the web over a chilled roll. A wetting agent may be required in the quenching medium to assure good wetting of the whole surface of the extruded web, including spaces between ribs of first reclosable fastener 40. The extruded material may be further processed, e.g., cutting the extruded ribs and subsequently stretching the web to form interruptions in the ribs such as taught by U.S. Pat. No. 4,894,060 (Nestegard).

Figure 12:
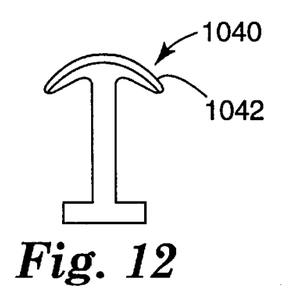
FIG. 12 is a tenth embodiment of a reclosable fastener usable with the splice cover of the present invention.

In some embodiments, it may be desired to incorporate an additive into or onto the reclosable fastener structure during or after manufacture of the reclosable fastener. For example, to facilitate the engagement of the reclosable fastener, a lubricant can be incorporated into or onto the reclosable fastener. Examples of suitable lubricants include silicone, graphite, and fluorocarbon-based materials such as polytetrafluoroethylene (commonly referred to as "Teflon"). An example of a reclosable fastener having a lubricant layer incorporated thereon is shown in FIG. 12 as reclosable fastener 1040 having lubricant layer 1042 on the head. Other additives, such as antistatic materials, UV blocks, fire retardants, and the like can be alternately or additionally added to the reclosable fastener.

Extrusion of splice cover 30 is preferred; but instead of extruding, splice cover 30 with reclosable fasteners 40 can be prepared in other ways, for example, by injection molding, casting, thermal forming or compression molding.

In any of the processes involving extrusion, molding, or casting, it is understood that using known techniques, splice cover 30 could be made via multiple steps. For example, first, body 38 can be extruded, and then first reclosable fastener 40 can be applied thereto, either by extruding reclosable fastener 40 directly onto body 38 or by adhering a previously extruded reclosable fastener 40 onto body 38.

Second reclosable fastener 50, base attachment segment 35, and any other structures having second reclosable fasteners 50 can be made in generally the same manner as splice cover 30.

One preferred splice cover of the present invention has body 38 comprising thermoplastic polyurethane (TPU) and first reclosable fasteners 40 comprising a blend of acrylonitrile-butadiene-styrene (ABS) terpolymer and polyurethane, positioned at or close to opposite longitudinal ends of body 38, such as at first end 32 and at second end 34. The splice cover is made via coextrusion of thermoplastic polyurethane (TPU) with a blend of acrylic-butadiene-styrene terpolymer and thermoplastic polyurethane, so that first reclosable fasteners 40 are primarily a TPU-ABS terpolymer blend and body 38 is primarily polyurethane. The TPU-ABS blend can be in a ratio of about 50:50 to about 90:10, preferably about 60:40 to 85:15.

Skived Areas within Web

Referring again to FIG. 2a, belt fastener 25 and splice cover 30 are preferably positioned in a skived or recessed depression 60 within web 15. By recessing splice cover 30 below the surface 15c of web 15, the likelihood of damaging cover 30, for example, by scraping blade 11, is reduced. Thus, it is preferred that outer surface 38b of splice cover 30 is either flush with or recessed with respect to belt surface 15c. The embodiments of FIGS. 2b and 2c may even pull down the leading edge of splice cover 30', 30" into the depression, such as depression 63. Various examples of configurations for depression 60 are shown in FIGS. 2, 13 and 14.

In FIG. 2a, belt fastener 25 is recessed within a depression, specifically within depression 61, which has sidewalls 61a and bottom 61b. Sidewalls 61a are straight-edged walls that are essentially perpendicular to bottom 61b and to surface 15c of web 15. Additionally, sidewalls 61a are essentially parallel to the stem of reclosable fasteners 140, 150.

In FIG. 13, belt fastener 325 is recessed within a depression, specifically within depression 62, which is defined by sidewalls 62a, 62c and bottom 62b. Sidewalls 62a, 62c are angled in respect to bottom 62b and to surface 15c. The angle a defined by sidewall 62a and bottom 62b is preferably less than 90 degrees for the leading edge of the belt splice. Preferably, angle $\alpha$ is more preferably about 1 to 60 degrees for the leading edge. For the trailing edge of the belt splice, the angle formed by sidewall 62c and bottom 62b, designated as angle $\beta$, is preferably greater than about 120 degrees.

In FIGS. 2b, 15 and 16, depression 63 is best described as having concave sidewalls. In some embodiments, it may be desired to have convex sidewalls. In FIG. 14, depression 63' has concave sidewall for the leading edge and an s-shaped sidewall for the trailing edge. As shown in FIGS. 15 and 16, there is no specific point at which sidewalls 63a end and bottom 63b begins. Rather, there is a transition area between sidewalls 63a and bottom 63b. In some embodiments, the depression may have a distinct point discerning the sidewalls from the bottom.

Although of exemplary configurations for depression 60 are disclosed, it is understood that any other shape or profile for depression 60 can be used.

Method of Positioning a Splice Cover

Splice cover 30 is positioned over belt fastener 25 preferably prior to belt 10 being used.

During the process of forming the splice in web 15 to create belt 10, second reclosable fastener 50 is attached to web 15. If second reclosable fastener 50 is present on base attachment segment 35, segment 35 is attached to web 15 by belt fasteners 25, as is shown in FIG. 2a. Base attachment segment 35 may be present as two portions, separated in the transverse direction relative to web 15, with one portion on each of belt ends 12, 14 in order to facilitate alignment of belt ends 12, 14 prior to attachment of belt fastener 25. Second reclosable fastener 50 can also be attached to, or integral with, belt fastener 25. The resulting belt 10 has second reclosable fastener 50 attached to web 15 and ready to accept splice cover 30.

To protect belt fasteners 25, first reclosable fasteners 40 of cover 30 are engaged with second reclosable fasteners 50 and splice cover 30 is positioned and held over belt fastener 25. To attach first reclosable fastener 140' of FIG. 2b to second reclosable fastener 150', base attachment segment 35' is folded as shown at the leading edge so that first reclosable fasteners 140' mate with second reclosable fasteners 150'. Similarly, to attach first reclosable fastener 140" of FIG. 2c over belt fastener 25, each of splice cover 30" and base attachment segment 35" are folded so that first reclosable fasteners 140" are aligned with second reclosable fasteners 150".

To facilitate engagement of first reclosable fastener 40 with second reclosable fastener 50, a lubricant, such as silicone, graphite, waxes, surfactants, or polytetrafluoroethylene can be applied as a powder or liquid on one or both of reclosable fasteners 40, 50. It has been found that the addition of a lubricant facilitates engagement and slidable transverse disengagement of reclosable fasteners 40, 50, but does not reduce the holding or engagement strength.

Referring again to FIG. 2a, to apply splice cover 30 over belt fastener 25, first reclosable fasteners 40 are aligned and joined with second reclosable fasteners 50. Similarly, referring to FIGS. 2b and 2c, to apply splice cover 30', 30" over belt fastener 25, first reclosable fasteners 140', 140" are aligned and joined with second reclosable fasteners 150', 150". To remove splice cover 30, first reclosable fasteners 40 are unmated, disengaged, or otherwise removed from second reclosable fasteners 50. When splice cover 30 is worn, damaged, or a new one is desired, splice cover 30 can be easily removed and a new splice cover positioned over belt fastener 25.

The invention will be further described and illustrated in the examples which follow. The examples are illustrative of the invention and should not be construed as limiting the scope to their details. All parts, percentages, ratios, etc. are by weight unless otherwise specified.

EXAMPLES

The following example describes the making and testing of a protective splice cover of the present invention.

A melt processable thermoplastic polyurethane ("PN3429-218"" available from the Huntsman Corp., Salt Lake City, Utah), dried at 150° F. (65° C.) for 4 hours, was fed into a single screw extruder (supplied by Davis Standard Corporation of Pawcatuck, Conn.) having a diameter of 2.5 inches (6.4 cm) and a length/diameter (L/D) ratio of 24/1. Simultaneously, a 3/1 weight ratio blend of the polyurethane and an acrylonitrile-butadiene-styrene (ABS) terpolymer resin ("Magnum 555 ABS", available from Dow Chemical Co. Midland, Mich.) was fed into a second single screw extruder (supplied by Davis Standard Corporation) having a diameter of 1.5 inches (3.8 cm) and a L/D of 30/1.

The two material streams were passed through their respective extruders and continuously discharged at a pressure of at least 100 psi through heated necktubes into one port of a 3-layer adjustable vane feedblock (supplied by Cloeren Corporation of Orange, Tex.). The feedblock was mounted on an 8-inch (20 cm) wide MasterFlex™ LD-40 film die (supplied by Production Components of Eau Clair, Wis.). Both extruders were operated with a flat temperature profile of approximately 400° F. (204° C.). Similarly, the necktubes, feedblock, and die were set to approximately 400° F. (204° C.).

The die had a die lip configured to form a polymeric base sheet with the self-mating reclosable fastener profile shown in FIG. 3. The feedblock was configured for two layers, such that the elastic polyurethane layer would make up the base layer (body 38) and the stiffer ABS-TPU layer would make up the reclosable fastener layer (first reclosable fastener 40).

The same material made up the base attachment segment 35 with second reclosable fastener 50.

The material thus extruded from the die was drop-cast at about 10 feet/minute (0.42 cm/sec) into a quench tank maintained at 50–60° F. (10–15° C.) for at least 10 seconds. The quench medium was filtered water. The quenched film was then air-dried and collected in 80–100 yard (73–91 meter) rolls. The extruded film had a structure as shown in FIG. 3, and had a uniform base film caliper of 0.009±0.001 inches (0.23±0.025 mm), a uniform coextruded layer thickness, a hook width (the distance between the outermost ends of the flange arms, measured in a plane parallel to the base film) of about 0.067 inches (1.7 mm), and an extruded basis weight of approximately 1 kg/m².

The coextruded self-mating reclosable fastener produced was laminated to a 0.040 inch (1.0 mm) thick sheet of the polyurethane. The 0.040 inch (1.0 mm) thick sheet used for lamination was generated via extrusion using conditions similar to those outlined above to generate a flat web at the desired thickness. Lamination was accomplished by heating the flat sheet in an oven set at 380° F. (193° C.) for 3–5 minutes, then applying a section of the profile extruded web to the molten polyurethane sheet so that the two polyurethane layers were contacted, and rolling the contacted layers together with a 5 lb. (2.3 kg) roller several times. The layers were then inspected visually to ensure effective lamination. The laminated fastener strips were cut into 1 inch by 6 inch (2.5 by 15.2 cm) strips with the fasteners situated transversely to the length of the strips.

To provide a base engagement segment (such as segment 35), a 1 mm thick polyurethane sheet was heat bonded to an aluminum panel to provide a stiff backing. The co-extruded self-mating reclosable fastener was then laminated onto the polyurethane layer. This was accomplished similarly to the lamination described above, except that the polyurethane resin and fastener sheets were both pre-cut to 2 inch by 6 inch (5.1 by 15.2 cm) pieces. The resin sheet was laid atop of the aluminum panel and heated in the oven as described. Lamination was then carried out as described, taking care to situate the fastener features parallel to the panel edge.

The base segment and cover sheet were then tested for engagement force and resistance to peel disengagement. Peel tests were carried out using a Sintech 2 tensile tester (available from the Sintech Co. of Stoughton, Mass.) equipped with hydraulic grips and a 200 lb. (about 90 kg) load cell. The base segment was mounted in the grips such that the cover sheet was pulled away from the base segment at an angle of 90° and a rate of 12 in/min (30.5 cm/min). The average and peak load was then determined from the load cell reading during the test.

To engage the reclosable fasteners, both mated halves were sprayed liberally with silicone lubricant (3M Silicone Lubricant, available from 3M, St. Paul, Minn.) immediatelly prior to engagement. Engagement was carried out by hand, with visual inspection to ensure all features were fully engaged. After each engagement and disengagement cycle, the cover sheet was replaced with a fresh sample and the test repeated immediately. Average and peak loads for each of the disengagement cycles are shown in Table 1.

TABLE 1

| Engagement Test | Average Load oz (kg) | Peak load oz (kg) |
| --- | --- | --- |
| 1 | 107.3 (3.0) | 376.5 (10.7) |
| 2 | 184.7 (5.2) | 325.8 (9.2) |
| 3 | 170.7 (4.8) | 329.3 (9.3) |
| 4 | 107.3 (3.0) | 350.2 (9.9) |
| 5 | 167.0 (4.7) | 572.9 (16.2) |
| 6 | 124.1 (3.5) | 579.9 (16.4) |
| 7 | 153.2 (4.3) | 401.0 (11.4) |
| 8 | 130.3 (3.7) | 417.1 (11.8) |
| 9 | 153.0 (4.3) | 232.5 (6.6) |
| Average | 144.2 (4.1) | 398.4 (11.3) |

Over the 9 cycles of spray/engage/peel, no visible distortion was observed in the reclosable fastener features mounted to the aluminum base segment. This result was observed in spite of the high loads incurred by disengaging the mated reclosable fasteners. The results indicate that a replaceable cover system of the current invention can withstand several cycles of engagement and forcible removal, despite the high load required to disengage. When disengagement is followed by replacement with a fresh mated cover, engagement is unaffected (no damage to interlocking features) and resulting peel forces remain high.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A conveyor belt comprising:
    (a) a conveyor belt web having a first surface, a first end and an opposite second end, the first end attached to the second end to form a splice;
    (b) a conveyor belt splice cover positioned over the splice, the conveyor belt splice cover comprising:
        (i) a flexible body having a first surface and an opposite second surface; and
        (ii) a plurality of first reclosable fasteners extending from the first surface; and
    (c) a plurality of second reclosable fasteners, configured to releaseably interlock with the first reclosable fasteners, the second reclosable fasteners extending from the first surface of the conveyor belt web, wherein the first reclosable fasteners are releaseably interlocked with the second reclosable fasteners.

2. The conveyor belt according to claim 1, wherein:
    (a) a belt fastener attaches the first end of the belt web to the second end of the belt web to form the splice; and
    (b) the splice cover is positioned over the belt fastener.

3. The conveyor belt according to claim 2, wherein:
    (a) the belt fastener comprises a metal fastener.

4. The conveyor belt according to claim 2, wherein:
    (a) the second reclosable fastener s are attached to the conveyor belt web by the belt fastener.

5. The conveyor belt according to claim 2, wherein:
    (a) the second reclosable fasteners are attached to the belt fastener.

6. The conveyor belt according to claim 5, wherein:
    (a) the second reclosable fasteners are integral with the belt fastener.

7. The conveyor belt according to claim 1, wherein:
    (a) the second reclosable fasteners extend from the first surface of the conveyor belt web.

8. The conveyor belt according to claim 1, wherein:
(a) at least one of the body, the first reclosable fasteners and the second reclosable fasteners comprises an elastomeric material, a polymeric material, or combinations thereof.

9. The conveyor belt according to claim 8, wherein:
(a) at least one of the body, the first reclosable fasteners and the second reclosable fasteners comprises acrylonitrile-butadiene-styrene terpolymer or polyurethane.

10. The conveyor belt according to claim 1, wherein:
(a) the splice cover has a leading edge and a trailing edge; and
(b) the plurality of first reclosable fasteners comprises:
    (i) a front portion of first reclosable fasteners at the leading edge; and
    (ii) a back portion of first reclosable fasteners at the trailing edge.

11. The conveyor belt according to claim 10, wherein:
(a) the front portion of first reclosable fasteners extends along at least a portion of the leading edge.

12. The conveyor belt according to claim 11, wherein:
(a) the front portion of first reclosable fasteners extends along the entire leading edge.

13. The conveyor belt according to claim 10, wherein:
(a) the back portion of first reclosable fasteners extends along at least a portion of the trailing edge.

14. The conveyor belt according to claim 13, wherein:
(a) the back portion of first reclosable fasteners extends along the entire trailing edge.

15. The conveyor belt according to claim 1, wherein the first reclosable fastener and the second reclosable fastener comprises a multiplicity of parallel, narrowly spaced, elastically deformable ribs having a length, the ribs comprising:
(a) a stem portion attached to and substantially upright from the body; and
(b) at least one flange attached to each side of the stem portion and spaced from the base sheet.

16. The conveyor belt according to claim 15, wherein:
(a) a first of the ribs has a first height and a second of the ribs has a second height, the second height being greater than the first height.

17. The conveyor belt according to claim 15, wherein:
(a) the ribs have a cross-sectional profile being substantially uniform over the length of the ribs; and
(b) an individual rib having a hook width that is sufficiently small to be accommodated between the stem portions of adjacent ribs and is greater than a gap between flanges on the adjacent ribs.

18. The conveyor belt according to claim 1, wherein:
(a) a single construction comprises the plurality of first reclosable fasteners and the plurality of second reclosable fasteners.

19. The conveyor belt according to claim 1, wherein:
(a) the conveyor belt web comprises:
    (i) a web thickness; and
    (ii) a portion having a reduced thickness, with the belt fastener and the second reclosable fastener located within the portion having the reduced thickness.

20. The conveyor belt according to claim 1, further comprising:
(a) a lubricant present on at least one of the first reclosable fastener and the second reclosable fastener.

21. The conveyor belt according to claim 20, wherein:
(a) the lubricant is silicone, graphite, wax, polytetrafluoroethylene, or a surfactant.

22. A method of placing a splice cover on a conveyor belt, the conveyor belt comprising a first end of a web attached to a second end of a web to form an endless loop, the method comprising:
(a) positioning a splice cover in alignment with the belt splice, the splice cover comprising:
    (i) a flexible body having a first side;
    (ii) a plurality of first reclosable fasteners extending from the first side; and
(b) attaching the splice cover to the conveyor belt over the belt splice by:
    (i) engaging the first reclosable fastener with a second reclosable fastener, the second reclosable fastener positioned on the conveyor belt.

23. The method according to claim 22, further comprising:
(a) providing a lubricant on at least one of the plurality of first reclosable fasteners and the plurality of second reclosable fasteners.

24. The method according to claim 22, further comprising:
(a) removing the splice cover from the conveyor belt; and then
(b) positioning a second splice cover in alignment with the belt splice, the second splice cover comprising:
    (i) a flexible body having a first side;
    (ii) a plurality of first reclosable fasteners extending from the first side; and
(c) attaching the second splice cover to the conveyor belt over the belt splice by:
    (i) interlocking the first reclosable fastener with a second reclosable fastener, the second reclosable fastener positioned on the conveyor belt.

25. A splice cover comprising:
(a) a flexible body having a first surface, an opposite second surface, a leading edge and a trailing edge, the body comprising:
    (i) thermoplastic polyurethane;
(b) a plurality of reclosable fasteners extending from the first surface of the body; the plurality of reclosable fasteners comprising:
    (i) thermoplastic polyurethane, and
    (ii) acrylonitrile-butadiene-styrene polymer.

26. The splice cover according to claim 25, wherein:
(a) the plurality of reclosable fasteners comprises a 60:40 to 85:15 weight ratio of the thermoplastic polyurethane and acrylonitrile-butadiene-styrene polymer.

27. The splice cover according to claim 25, wherein:
(a) the plurality of reclosable fasteners comprises:
    (i) a front portion of reclosable fasteners at the leading edge; and
    (ii) a back portion of reclosable fasteners at the trailing edge.

28. A method of making a splice cover comprising the steps of:
(a) extruding a first material comprising thermoplastic polyurethane;
(b) extruding a second material comprising a blend thermoplastic polyurethane and acrylonitrile-butadiene-styrene terpolymer;
(c) discharging the extruded first material and extruded second material into a feedblock designed to arrange the first and second materials into a uniform layered stream; and (d) directing the uniform layered stream into a film die, the film die configured and arranged to form a body comprising the first material and having a plurality of reclosable fasteners extending therefrom, the plurality of reclosable fasteners comprising the second material.

29. The method according to claim 28, wherein the step of extruding a second material comprises:

(a) extruding the second material comprising a 60:40 to 85:15 weight ratio blend of polyurethane:acrylonitrile-butadiene-styrene terpolymer.

* * * * *

UNITED STATES PATENT AND TRADEMARK OFFICE
CERTIFICATE OF CORRECTION

PATENT NO. : 6,516,943 B2
DATED : February 11, 2003
INVENTOR(S) : Engle, Lori P.

It is certified that error appears in the above-identified patent and that said Letters Patent is hereby corrected as shown below:

Column 4,
Line 40, insert -- . -- after "thereof"

Column 5,
Line 48, insert -- . -- after "thereof"

Column 11,
Line 56, insert -- . -- after "thereof"

Column 13,
Line 28, delete "a" and insert -- α --.

Column 14,
Line 57, delete "Eau Clair" and insert -- Eau Claire --

Column 16,
Line 56, delete "fastener s" and insert -- fasteners --

Signed and Sealed this

Sixteenth Day of December, 2003

JAMES E. ROGAN
*Director of the United States Patent and Trademark Office*